United States Patent
Wohlrabe

(10) Patent No.: US 6,326,884 B1
(45) Date of Patent: *Dec. 4, 2001

(54) METHOD OF TRANSMITTING DATA BETWEEN A SMALL ELECTRIC APPLIANCE AND A SUPPLEMENTARY ELECTRIC APPLIANCE CONNECTIBLE THEREWITH, AS WELL AS APPLIANCES SUITABLY CONFIGURED FOR THIS PURPOSE

(75) Inventor: Frank Wohlrabe, Kronberg (DE)

(73) Assignee: Braun GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,695

(22) Filed: Apr. 14, 1999

(30) Foreign Application Priority Data

Apr. 18, 1998 (DE) .............................. 198 17 273

(51) Int. Cl.[7] ...................................... H04B 1/00
(52) U.S. Cl. ................ 340/310.01; 340/310.02; 340/310.06; 340/310.08
(58) Field of Search ............... 340/310.01, 310.02, 340/310.06, 310.08

(56) References Cited

U.S. PATENT DOCUMENTS

| | | | |
|---|---|---|---|
| 4,418,333 | * 11/1983 | Schwarzbach et al. | 340/310.05 |
| 4,665,399 | 5/1987 | Fauser et al. | 340/870.32 |
| 4,714,912 | * 12/1987 | Roberts et al. | 340/310.01 |
| 4,910,753 | 3/1990 | Wakatsuki et al. | 375/317 |
| 5,051,720 | * 9/1991 | Kittirutsunetorn | 340/310.01 |
| 5,504,864 | 4/1996 | Berg | 709/253 |
| 5,581,229 | * 12/1996 | Hunt | 340/310.02 |
| 5,710,712 | * 1/1998 | Labum | 340/825.06 |

FOREIGN PATENT DOCUMENTS

| | | |
|---|---|---|
| 3312600 A1 | 10/1984 | (DE) . |
| 3417455 A1 | 11/1985 | (DE) . |
| 4119094 A1 | 1/1993 | (DE) . |
| 42 04 237 A1 | 8/1993 | (DE) . |
| 44 02 236 C2 | 9/1996 | (DE) . |
| 19537280 A1 | 4/1997 | (DE) . |
| 196 12 089 A1 | 10/1997 | (DE) . |
| 196 06 719 C2 | 12/1997 | (DE) . |
| 0 148 458 | 7/1985 | (EP) . |
| 2599877 | 6/1986 | (FR) . |

OTHER PUBLICATIONS

Michael Arzberger et al., "Das Stromnetz als Kommunikationsmedium", Funkschau, Jun. 20, 1996, p. 70–73.

* cited by examiner

Primary Examiner—Donnie L. Crosland
(74) Attorney, Agent, or Firm—Fish & Richardson P.C.

(57) ABSTRACT

The apparatus includes a method of transmitting data between a small electric appliance such as an electric hair cutting apparatus, an electric toothbrush or a household appliance, and a supplementary electric appliance connectible therewith such as a charging, cleaning or diagnostic device, as well as to appliances suitably configured for this purpose. The supplementary appliance supplies to the power supply connection of the small electric appliance an electric current, an electric voltage or an electric and/or magnetic field which is modulated with a corresponding data signal by the small electric appliance or by the supplementary appliance, depending on the desired direction of data transmission. Demodulation is effected in the receiving appliance.

13 Claims, 1 Drawing Sheet

Figure 1:
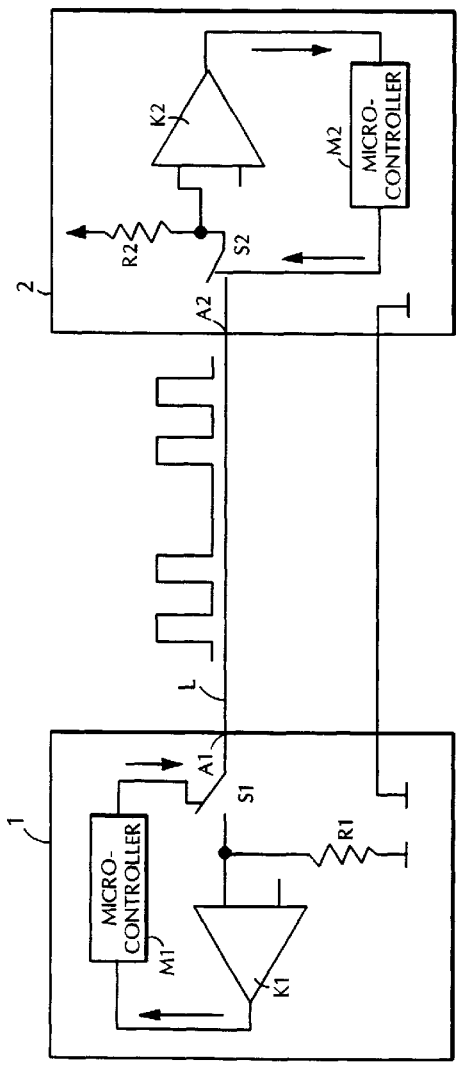

METHOD OF TRANSMITTING DATA BETWEEN A SMALL ELECTRIC APPLIANCE AND A SUPPLEMENTARY ELECTRIC APPLIANCE CONNECTIBLE THEREWITH, AS WELL AS APPLIANCES SUITABLY CONFIGURED FOR THIS PURPOSE

This invention relates to a method of transmitting data between a small electric appliance such as an electric hair cutting apparatus, an electric toothbrush or a household appliance, and a supplementary electric appliance connectible therewith such as a charging, cleaning or diagnostic device, as well as to appliances suitably configured for this purpose.

From DE 196 12 089 A1 a shaving apparatus or an apparatus cooperating therewith is known having a microcontroller and an indicating device for indicating current operating conditions, which apparatus can be set to a particular output mode in which specific items of information stored in the microcontroller and relating to the use history of the shaving apparatus or the co-operating apparatus can be called up. Activation of the separate output mode is effected, for example, in that a special power supply unit applies different voltages in a predetermined time-related sequence to the power supply connection of the shaving apparatus or the cooperating apparatus. Output of the stored information items is either by means of the existing indicating device or through a separate interface.

From DE 196 06 719 C2 an electric shaver having a controller is known, which is able to issue a signal indicative of the need to clean the shaver, as well as a cleaning device for a shaver which functions at the same time as a holder for the shaver. When the shaver rests in the cleaning device, the controller can be connected with the cleaning device via the power contact of the shaver such as to enable a signal transmission between the shaver and the cleaning device. To prevent the cleaning device from unnecessarily performing a cleaning cycle each time it holds the shaver, the cleaning device is activated only when the controller supplies a corresponding signal to the cleaning device. Details concerning methods or circuit arrangements suitable for signal transmission are not given.

It is therefore an object of the present invention to provide a particularly simple method of transmitting data between a small electric appliance and a supplementary electric appliance connectible therewith, as well as to provide appliances equipped with the suitable circuit configuration.

This object is accomplished in the method of the present invention in that the supplementary appliance delivers to a power supply connection of the small electric appliance an electric current, an electric voltage or an electric and/or magnetic field which is modulated with a corresponding data signal by the small electric appliance or by the supplementary appliance, depending on the desired direction of data transmission. Demodulation takes place in the receiving appliance. A small electric appliance having a power supply socket receives the current or the voltage preferably through the power supply socket, while in a small electric appliance operated by primary battery the battery contacts are utilized for this purpose. In a small electric appliance operated by secondary battery and absent any other externally accessible connections, in particular an inductive energy transmission would be an obvious choice known in the art. Therefore, in all cases referred to, no additional connection for data transmission is required on the small electric appliance.

Data transmission may also take place when the small electric appliance is not in operation. In a small electric appliance having a rechargeable battery, data may be transmitted as by modulating the charging current or the charging voltage, that is, during the recharging cycle. In a method affording particular ease of implementation, modulation is effected by turning the current, the voltage or the field on and off. It will be understood, of course, that any other known method of data transmission may also be employed.

A small electric appliance configured in accordance with the present invention includes a power supply connection through which current from a supplementary appliance can be supplied over a line, to which the supplementary appliance can apply a voltage, or to which the supplementary appliance can apply an electric and/or magnetic field. Correspondingly, a supplementary appliance configured in accordance with the present invention, such as a diagnostic or cleaning device, is configured such as to be able to supply to the small electric appliance a current, a voltage or a field which are of a magnitude sufficient for data transmission. As an added feature, the supplementary appliance may also find application as a supplier of current or voltage and/or as a charging device for the small electric appliance.

In cases in which the small electric appliance includes an indicating device, the present invention has the advantage of dispensing with the need for an indicating device on the supplementary appliance, because any data needing to be displayed is transmitted to the small electric appliance for output on its indicating device. Conversely, data stored in the small electric appliance, such as the number or the duration of past uses and/or the associated charging conditions of a storage battery built in the small electric appliance, can be transmitted to the supplementary appliance to be displayed there on a larger indicating device with greater clarity than would be possible on the indicating device of the small electric appliance.

However, data transmission is also understood to include the transmission of control instructions by means of which specific functions of the small electric appliance can be activated by the supplementary appliance. For example, in cases in which the small electric appliance is an electric shaver and the supplementary appliance is a shaver cleaning device as described in DE 44 02 236 C2, the cleaning device is in a position to turn the shaver on and off at the appropriate moment during the cleaning cycle. Because the shaver is held "upside down" in this cleaning device, the cleaning device is able to issue a control instruction for switching the indicating device of the shaver to the effect that the information output is equally shown as turned "upside down" instead of "in the proper position", enabling it to be read with ease.

The present invention will be described in the following with reference to two embodiments illustrated in the accompanying drawings. Further configurations are set out in the description. In the drawings, FIG. 1 is a schematic view of a small electric appliance and a supplementary appliance of the present invention, in which data is transmitted over a line by modulation of a direct current; and FIG. 2 is a schematic view of a small electric appliance and a supplementary appliance of the present invention, in which data is transmitted inductively by modulation of an alternating current.

When it is desired to transmit data from the supplementary appliance to the small electric appliance, the supplementary appliance includes a device for modulating the energy supplied by it, while the small electric appliance includes a device for demodulation. When it is desired to effect data transmission in the opposite direction, the supplementary appliance includes a demodulating device, while the small electric appliance includes a modulating device. For data transmission in both directions, both the small electric appliance and the supplementary appliance are equipped with devices for modulation and devices for demodulation as well.

Figure 2:
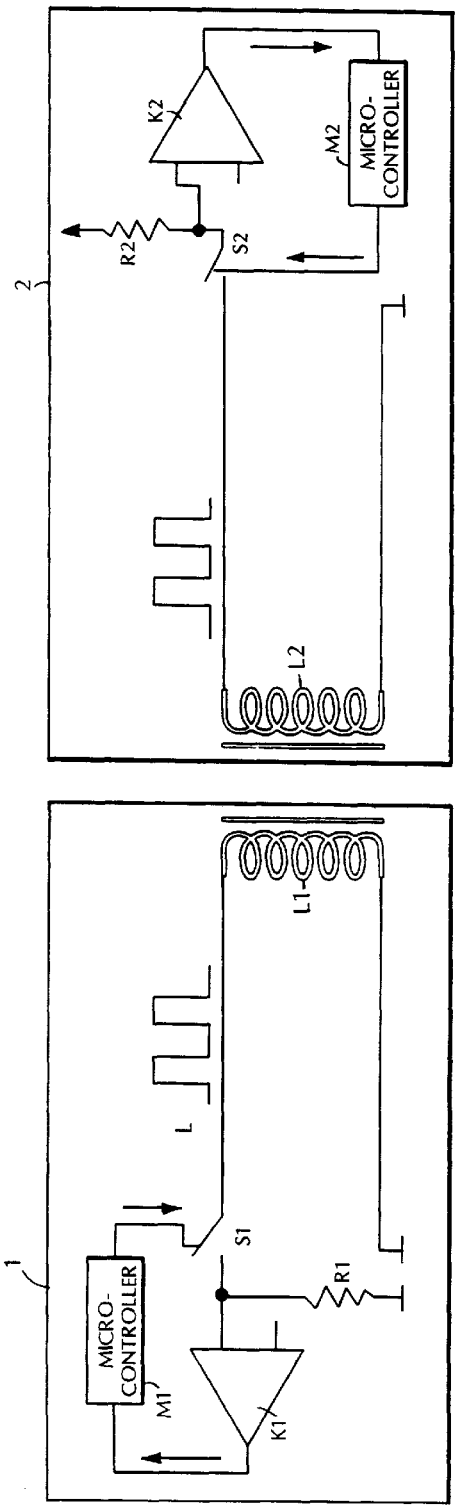

The appliances of the present invention illustrated in FIGS. 1 and 2, that is, a small electric appliance 1 and a supplementary appliance 2, are suited to bidirectional data transmission using current modulation and are identical as regards the devices necessary for data transmission. Both appliances comprise equally a demodulating device which has a current sensor, a modulating device which has a controllable switch S1, S2 connected to the current sensor and to a power supply connection A1, A2, and a microcontroller M1, M2 which is connected to the current sensor and to the controllable switch S1, S2.

The microcontroller processes the data to be transmitted, that is, in the transmit mode it produces a data signal which is fed to the controllable switch so that the current flowing through the power supply connection is amplitude-modulated by corresponding opening and closing of the switch. In the receive mode the microcontroller keeps the controllable switch closed, causing the current sensor to be connected to the power supply connection, retrieving the data from the signal supplied by the current sensor. The current sensor is implemented by a comparator K1, K2 and a resistor R1, R2, producing a digital signal from an amplitude-modulated current.

In other embodiments of the small electric appliance and the supplementary appliance of the present invention, the controllable switch and the current sensor may be replaced by other modulating and demodulating circuit arrangements known in the art, by means of which a data transmission is implemented, for example, by modulating a direct voltage or by applying other modulating methods, in particular frequency, phase or pulse modulation.

The method of transmitting data will be described in the following with reference to FIG. 1. The two appliances are linked by a line L connecting the power supply connections A1, A2 of the appliances. In the initial condition, the controllable switches S1 and S2 are closed in both appliances. Hence the supplementary appliance 2 supplies an unmodulated current to the small electric appliance 1.

When data is to be transmitted from the supplementary appliance to the small electric appliance, the microcontroller M2 of the supplementary appliance checks by means of its current sensor whether this current is unmodulated and hence suitable for data transmission. If it is established that the current is unmodulated, the microcontroller then drives the controllable switch S2 with a data signal corresponding to the data to be transmitted, such as an instruction sequence, whereby this switch is opened and closed in a defined sequence until the data is emitted. At the same time, the microcontroller M1 of the small electric appliance detects by means of its current sensor that the supplied current is modulated, demodulating the received data.

Data transmission in the opposite direction, that is, from the small electric appliance to the supplementary appliance, takes place in a corresponding manner. First the microcontroller M1 of the small electric appliance checks by means of its current sensor whether the supplied current is unmodulated and hence suitable for data transmission. If it is established that the current is unmodulated, the microcontroller then drives the controllable switch S1 with a data signal corresponding to the data to be transmitted, such as an instruction sequence, whereby this switch is opened and closed in a defined sequence until the data is emitted. At the same time, the microcontroller M2 of the supplementary appliance detects by means of its current sensor that the supplied current is modulated, demodulating the received data.

The small electric appliance and the supplementary appliance illustrated in FIG. 2 differ from the appliances shown in FIG. 1 only by a coil L1 and L2, respectively, which enables energy and/or data to be transmitted inductively in a manner known in the art. Any devices that may be necessary for rectifying or smoothing the modulated alternating current are not shown for the sake of clarity of illustration.

What is claimed is:

1. A method of transmitting data between a first electric appliance having a power supply connection and a second electric appliance connectible therewith, comprising:
   directly connecting the second appliance to the power supply connection of the first electric appliance;
   supplying power over the power supply connection via a signal medium that is selected from one of the group consisting of an electric current, an electric voltage an electric field and a magnetic field; and
   modulating the signal medium by at least one of the first electric appliance and the second appliance for data transmission purposes; and
   transmitting the modulated carrier signal over the power supply connection between the first and second appliance.

2. The method as claimed in claim 1, wherein the first electric appliance has a rechargeable battery connected to the power supply connection, said method further comprising supplying one of a charging current and a charging voltage to the rechargeable battery through the power supply connection and wherein said carrier signal is said one of said charging current and said charging voltage.

3. The method as claimed in claim 1 or 2, wherein modulating said carrier signal comprises turning the carrier signal on and off.

4. The method of transmitting data of claim 1, wherein the first electric appliance is selected from the group consisting of an electric hair cutter, an electric toothbrush, and an electric household apparatus.

5. The method of transmitting data of claim 1, wherein the second appliance is selected from the group consisting of an electric appliance charging device, an electric appliance cleaning device and an electric appliance diagnostic device.

6. An electric appliance comprising:
   a housing;
   a power supply connection;
   a power supply element disposed within said housing, which during operation supplies power to the power supply connection via a signal medium selected from one of an electric current, an electric voltage, an electric field, and a magnetic field; and
   a signal processing device which during operation performs at least one of modulating and demodulating the signal medium supplied to the power supply connection.

7. An electric appliance that is selected from the group consisting of an electric hair cutter, an electric toothbrush, and an electric household apparatus, said appliance comprising:
   a housing;

a power supply connection disposed in said housing, through which the appliance receives power delivered via a signal medium selected from one of an electric current, an electric voltage, an electric field, and a magnetic field; and a signal processing device for performing at least one of modulating and demodulating said signal medium received through the power supply connection.

8. The electric appliance of claim 6 or 7, wherein the housing is hand-holdable, whereby the appliance is portable.

9. The appliance as claimed in claim 6 or 7, wherein the signal processing element is a modulating device including a controllable switch and a control circuit for driving the controllable switch.

10. The appliance as claimed in claim 6 or 7 wherein the signal processing device is a demodulating device including an evaluation circuit and a sensor chosen from the group consisting of a current sensor and a voltage sensor.

11. The appliance as claimed in claim 10, wherein the sensor chosen from the group consisting of the current sensor and the voltage sensor includes a resistor and a comparator.

12. The appliance as claimed in claim 9, wherein at least one of the control circuit and the evaluation circuit is implemented by a microcontroller.

13. The small electric appliance as claimed in claim 6 or 7, further comprising a switchable indicating device enabling information to be displayed selectively in the proper position or upside down.

* * * * *